United States Patent
Lavergne et al.

(10) Patent No.: US 12,129,035 B2
(45) Date of Patent: Oct. 29, 2024

(54) AIRCRAFT CABIN ELECTRICAL AIR CONDITIONING SYSTEM COMPRISING A MOTORIZED COMPRESSOR AND AN AIR CYCLE TURBOMACHINE

(71) Applicant: LIEBHERR-AEROSPACE TOULOUSE SAS, Toulouse (FR)

(72) Inventors: David Lavergne, Toulouse (FR); Frederic Sanchez, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 345 days.

(21) Appl. No.: 17/621,572

(22) PCT Filed: Jun. 16, 2020

(86) PCT No.: PCT/FR2020/051034
§ 371 (c)(1),
(2) Date: Dec. 21, 2021

(87) PCT Pub. No.: WO2020/254755
PCT Pub. Date: Dec. 24, 2020

(65) Prior Publication Data
US 2022/0355938 A1  Nov. 10, 2022

(30) Foreign Application Priority Data

Jun. 21, 2019 (FR) ..................... 1906745

(51) Int. Cl.
*B64D 13/06* (2006.01)

(52) U.S. Cl.
CPC ...... *B64D 13/06* (2013.01); *B64D 2013/0611* (2013.01); *B64D 2013/0644* (2013.01)

(58) Field of Classification Search
CPC ............ B64D 13/06; B64D 2013/0611; B64D 2013/0644
See application file for complete search history.

(56) References Cited

U.S. PATENT DOCUMENTS 9,724,979 B1 * 8/2017 Thumati ............ G05B 23/0254
2007/0157913 A1   5/2007 Claeys et al.
(Continued)

*Primary Examiner* — Raheena R Malik
(74) *Attorney, Agent, or Firm* — CRGO Global; Steven M. Greenberg

(57) ABSTRACT

The invention relates to an electrical air conditioning system for air conditioning a cabin (10) of an aircraft comprising a source (11) of fresh air, a dynamic air circulation duct (12), a motorized compressor (13) comprising an air inlet connected to said source of fresh air, and an air outlet connected to a primary cooling exchanger (PHx) housed in said dynamic air duct; an air cycle turbomachine (14) comprising at least a first compressor (15) and a first turbine (17) that are mechanically coupled to one another, said first compressor comprising an air inlet that can be connected either to said primary cooling exchanger (PHx) or to said source (11) of fresh air, and an air outlet connected to a main cooling exchanger (MHx) housed in said dynamic air duct, said first turbine (17) comprising an air inlet that can be connected either to a discharge port (54) for discharging stale air from said cabin or to said main cooling exchanger (MHx), and an air outlet that can be connected either to said cabin (10) or to an air injector (52) opening into said dynamic air duct.

8 Claims, 3 Drawing Sheets

(56) References Cited

U.S. PATENT DOCUMENTS

| | | |
|---|---|---|
| 2018/0057175 A1 | 3/2018 | Klimpel et al. |
| 2019/0135440 A1 | 5/2019 | Bruno et al. |
| 2020/0010202 A1* | 1/2020 | Bammann .............. B64D 13/06 |

\* cited by examiner

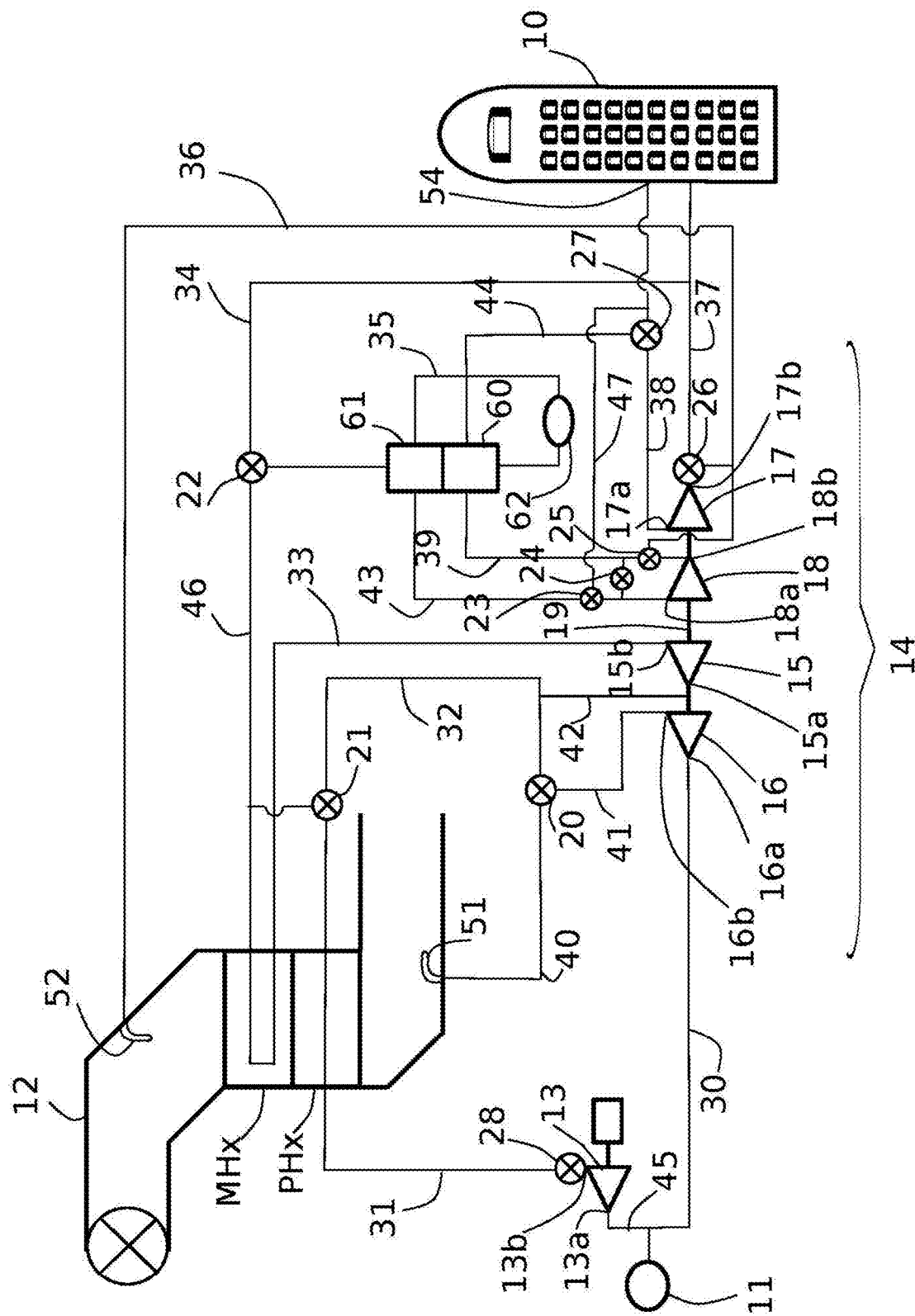
[Fig. 1]

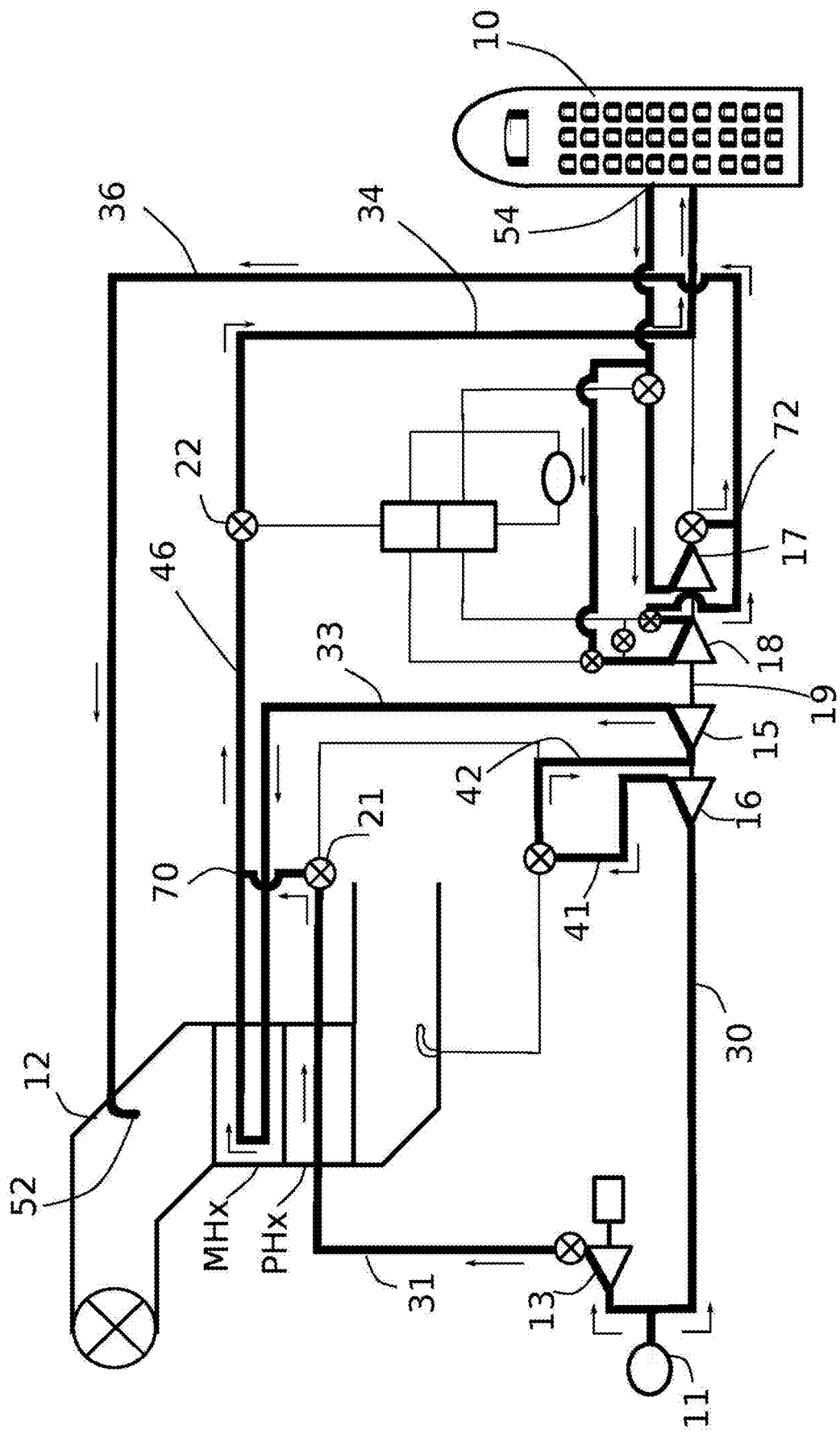
[Fig. 2]

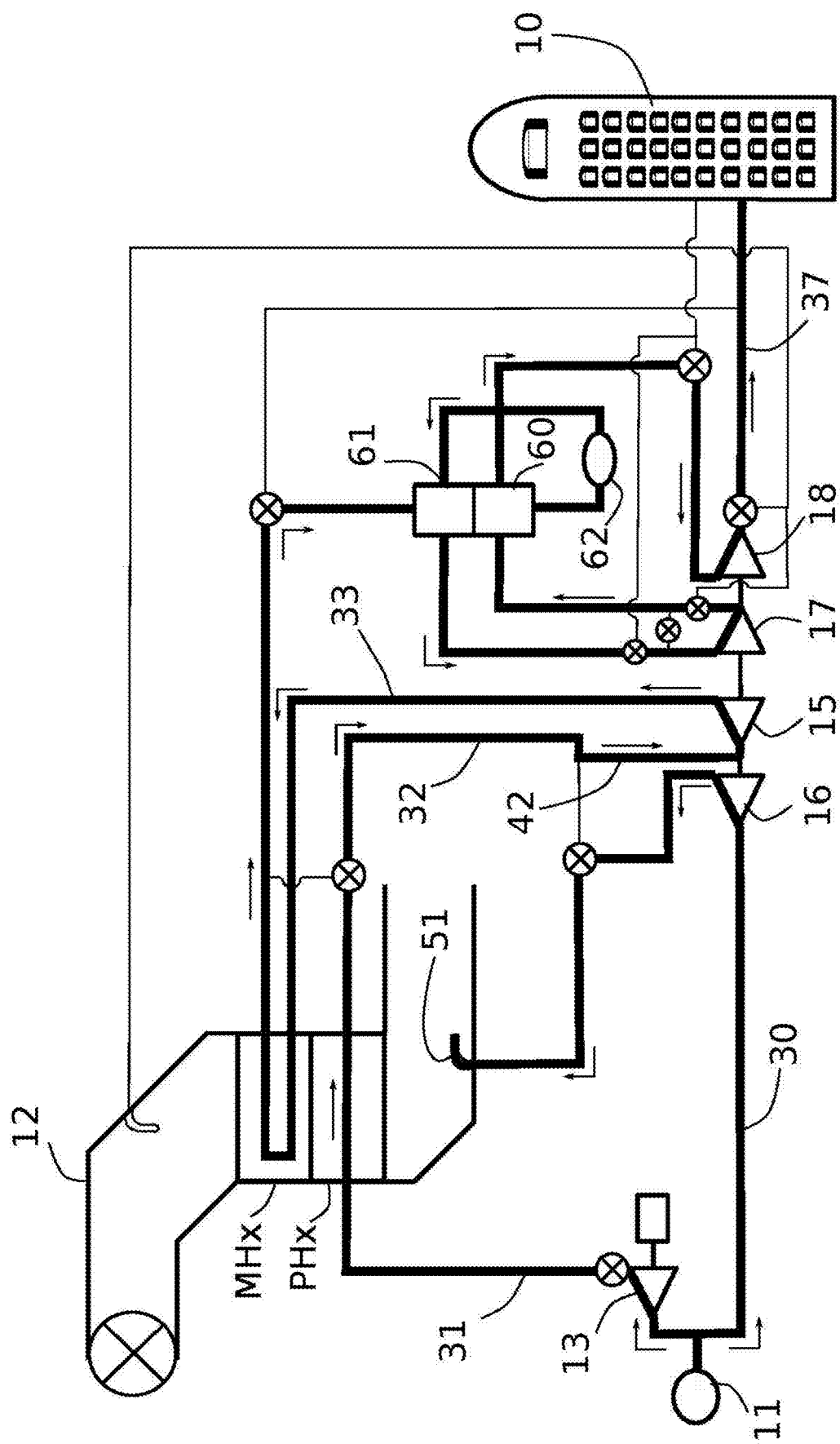
[Fig. 3]

AIRCRAFT CABIN ELECTRICAL AIR CONDITIONING SYSTEM COMPRISING A MOTORIZED COMPRESSOR AND AN AIR CYCLE TURBOMACHINE

CROSS-REFERENCE TO RELATED APPLICATIONS

This application is a § 371 national phase entry of International Application No. PCT/FR2020/051034, filed Jun. 16, 2020, which claims priority to French Patent Application No. 1906745, filed Jun. 21, 2019.

TECHNICAL FIELD OF THE INVENTION

The invention relates to an aircraft cabin electrical air conditioning system. In particular, the invention relates to an air conditioning system comprising a motorized compressor and an air cycle turbomachine.

TECHNOLOGICAL BACKGROUND

Throughout the text, the term "cabin" denotes any interior space of an aircraft in which the pressure and/or temperature of the air must be controlled. This may be a cabin for passengers, the pilot's cockpit, a hold, and in general any area of the aircraft that requires air at a controlled pressure and/or temperature. This air at a controlled pressure and/or temperature is supplied by an air conditioning system.

Throughout the text, the term "motorized compressor" denotes a compressor equipped with an electric motor. The compressor comprises an air inlet, an air outlet and a paddle wheel adapted so as to be able to be traversed by a compressible fluid such as air, arranged between the inlet and the outlet, and driven in rotation by said electric motor so as to be able to suck in air from the compressor inlet, modify its pressure, temperature and/or speed, and deliver it to the air outlet.

There are a number of aircraft in which the environmental control of the cabins is carried out entirely pneumatically, i.e. by systems operating on air taken from the compressors of the propulsion engines of the aircraft and/or outside air at dynamic pressure, which is more or less significant depending on the type of outside air intake—scoop, low-drag air inlet, etc.—and better known by the acronym of air RAM, when the aircraft is in flight.

Throughout the following text, the concept of dynamic air refers to air taken from outside the aircraft by all types of known means, such as a scoop, a low-drag air inlet, also referred to as a flush/NACA inlet, etc.

The general problem which has arisen for some time with this type of air conditioning system is how to minimize the air bleed on the compressors of the engines, so as in turn to minimize the impact of this air bleed on kerosene consumption and on engine performance. Another problem consists in being able to control the temperature and pressure in the cabin during all the operating phases of the aircraft, including the take-off, descent and ground phases.

The new generations of aircraft now favor electrical air conditioning systems so as to eliminate the need for air bleed from the compressors of propulsion engines.

Thus, electrical air conditioning systems have already been proposed, comprising several motorized turbomachines allowing the flow rate and the fresh air pressure necessary for the pressurization of the cabin to be generated.

Given the large difference in suction density of the compressors between operation on the ground and in flight, the electrical systems currently proposed are based on at least two high-power motorized turbomachines organized so that a single motorized turbomachine can be used on the ground and the various motorized turbomachines can be used in flight to provide cabin air conditioning. These systems are also equipped with a steam cycle that provides additional cold power when necessary.

One of the drawbacks of these electrical solutions is their complexity, in particular because of the large number of motorized turbomachines required and the need to have a steam cycle in addition to the air cycle.

The inventors have therefore sought to propose a new architecture for an air conditioning system that limits the number of motorized turbomachines necessary and no longer requires the use of a steam cycle.

AIMS OF THE INVENTION

The invention aims to provide an electrical air conditioning system for an aircraft cabin.

The invention aims in particular to provide such an air conditioning system that does not require the presence of a steam cycle.

The invention also aims to provide an air conditioning system that comprises only a single motorized electric machine.

The invention also aims to provide such an air conditioning system that benefits from an optimized and compact assembly, thus saving in mass and/or size.

The invention also aims to provide such an air conditioning system that is reliable and that allows the reduced flow rate range between the conditions of the aircraft on the ground or in flight to be limited.

The invention also aims to adapt the behavior of the air conditioning system to the flight conditions of the aircraft, and in particular to its altitude.

The invention lastly aims to provide a method for the electrical air conditioning of an aircraft cabin.

DISCLOSURE OF THE INVENTION

To do this, the invention relates to an electrical air conditioning system for a cabin of an aircraft comprising a source of fresh air, a circulation duct for dynamic air taken from outside the aircraft, a network of pipes and control valves configured to be able to regulate the flow of air circulating through said pipes according to the flight conditions of the aircraft, a heat exchanger, called the primary cooling exchanger, housed in said dynamic air circulation duct, and a heat exchanger, called the main cooling exchanger, housed in said dynamic air circulation duct.

An electrical air conditioning system according to the invention is characterized in that it comprises:
- an air injector opening into said dynamic air duct upstream of said cooling exchangers,
- a port for discharging stale air from said cabin,
- an electrically driven motorized compressor comprising an air inlet fluidically connected to said source of fresh air by said network of pipes, and an air outlet connected to said primary cooling exchanger (also denoted throughout the text by the acronym PHx), housed in said dynamic air circulation duct,
- an air cycle turbomachine comprising at least a first compressor and a first turbine, mechanically coupled to one another by a mechanical shaft,
  said first compressor comprising an air inlet adapted so as to be able to be fluidically connected by said network of pipes, at the command of said control valves, either to said primary cooling exchanger, or to said source of fresh air, and an air outlet fluidically connected to said main cooling exchanger (also denoted throughout the text by the acronym MHx), housed in said circulation duct for dynamic air taken from outside the aircraft, said first turbine comprising an air inlet adapted so as to be able to be fluidically connected by said network of pipes, at the command of said control valves, either to said discharge port for discharging stale air from said cabin, or to said main cooling exchanger, and an air outlet adapted so as to be able to be fluidically connected, by said network of pipes, at the command of said control valves, either to said cabin in order to be able to supply it with air at a controlled pressure and temperature, or to said air injector opening into said air circulation duct, upstream of said cooling exchangers.

An air conditioning system according to the invention (also denoted by the term "air conditioning pack") therefore comprises a single electric machine (the electrically driven motorized compressor) and a single pneumatic machine (the air cycle turbomachine).

The particular architecture of an air conditioning system according to the invention makes it possible to maximize the cold power produced by the air cycle on the ground by increasing the operating pressure and the efficiency of the cycle by achieving dual-stage compression (obtained by the successive compression of the motorized compressor and the first compressor of the turbomachine), followed by intermediate cooling (obtained by the main exchanger), and by expansion (obtained at least by the first turbine of the air cycle turbomachine). A system according to the invention is therefore free from a steam cycle.

The particular architecture of the air conditioning system according to the invention also allows the additional fresh air flow to be generated in flight by recovering the energy of the stale air discharged from the cabin, in order to supply at least one expansion turbine of the air cycle turbomachine, which then puts at least the first compressor of the turbomachine into rotation, so that it can compress the fresh air supplied by the fresh air source. This fresh air flow produced by the air cycle turbomachine makes it possible to reduce the flow rate of the motorized compressor.

The architecture of an air conditioning system according to the invention also allows the dynamic air in the dynamic air duct to be cooled in flight by the air injector opening upstream of the cooling exchangers, and supplied with air from the turbine of the turbomachine. This allows the drag of the aircraft to be limited by reducing the consumption of outside air.

Switching from ground mode to flight mode and vice versa is performed by controlling the control valves arranged on the network of pipes that connect the various components of the air conditioning system according to the invention.

This control of the valves is a function of the flight conditions, which can, for example, be represented by information relating to the loaded weight loaded onto the wheels or the speed of the aircraft.

An air conditioning system according to the invention also allows for the optimal management of all the operating points in a compressor field with variable diffuser. In other words, it is possible to bring the operating point of the compressor on the ground closer to the operating point of the compressor in flight.

All of these advantages further allow for an optimized and compact integration, and in particular for savings in mass and bulk, by performing the air conditioning functions with a limited number of items of equipment while maintaining great flexibility.

In addition, the invention makes it possible to obtain a reliable, flexible air conditioning system that can be adapted to the various flight conditions of the aircraft, and in particular as a function of its altitude.

Advantageously and according to the invention, said air cycle turbomachine comprises at least a second compressor and a second turbine mechanically coupled to said first compressor and to said first turbine by said mechanical shaft, said second compressor comprising an air inlet fluidically connected to said source of fresh air, and an air outlet adapted to be able to be fluidically connected, on command by said control valves, either to said air inlet of said first compressor, or to an air pump opening into said dynamic air duct downstream of said cooling exchangers, said second turbine comprising an air inlet adapted so as to be able to be fluidically connected, at the command of said control valves, either to said main cooling exchanger, or to said stale air discharge port of said cabin, and an air outlet adapted so as to be able to be fluidically connected, at the command of said control valves, either to said air inlet of said first turbine, or to said injector opening into said dynamic air duct upstream of said cooling exchangers.

According to this advantageous variation, the air cycle turbomachine is a four-wheel machine, with two compressors and two turbines mounted on the same mechanical shaft.

This advantageous variation makes it possible, on the ground in particular, to ensure the circulation of dynamic air in the air circulation duct by the air pump opening into the dynamic air circulation duct supplied by the outlet of the second compressor, which is supplied at its inlet by fresh air from the fresh air source.

This advantageous variation also makes it possible to ensure a double expansion on the ground by the two turbines supplied in series before supplying the cabin.

This advantageous variation also allows a two-stage compression in flight, provided by the two compressors of the air cycle turbomachine supplied in series by the fresh air source.

This advantageous variation also makes it possible, to ensure the rotation of the two compressors in flight by means of the two turbines supplied in parallel by the stale air discharged from the cabin.

According to this aspect of the invention, the air leaving the cabin of the aircraft, denoted as "stale air," is recovered to supply the inlet of the two turbines of the air conditioning system. This allows energy recovery to be able to put the compressors of the turbomachine in rotation.

According to another variation, the air circulation in the dynamic air circulation duct can be provided by an electric fan or by a fan mounted on the shaft of the air cycle turbomachine.

Advantageously, a system according to the invention further comprises a water extraction loop adapted to be able to be fluidically connected by said network of pipes, at the command of an altitude valve, to said main cooling exchanger and to at least one turbine of said air cycle turbomachine, so as to be able to extract the water present in the air delivered by said main cooling exchanger, before being delivered to this expansion turbine.

When required by the flight conditions, and below a predetermined altitude, the system according to the invention will therefore allow the air to be dried by means of the water extraction loop, before supplying the expansion turbines of the air cycle turbomachine. Beyond this predetermined altitude, a system according to the invention also allows the water extraction loop to be bypassed when the air is sufficiently dry and cool to be able to supply the aircraft cabin.

Advantageously and according to the invention, said control valves are controlled to allow at least the following operating modes:
  an operating mode called the ground mode, in which said motorized compressor is supplied by the fresh air source so as to be able to compress this air, which, after cooling by said primary cooling exchanger, is then directed to the first compressor of said air cycle turbomachine to undergo a second compression therein, then to said water extraction loop and said turbines of the turbomachine supplied in series to undergo a double expansion therein before supplying said cabin of the aircraft, and in which said second compressor of said turbomachine is further supplied by said fresh air source, which, after compression, is then directed to said air pump arranged downstream of the cooling exchangers to ensure dynamic air circulation in said dynamic air duct,
  an operating mode called the flight mode, in which said fresh air source supplies, in parallel, said motorized compressor and said compressors of said turbomachine supplied in series, so as to be able to undergo a double compression therein before being cooled by said primary cooling exchanger and said main cooling exchanger respectively, and to be combined in a common air flow directed to said cabin by short-circuiting said extraction loop, and which in said turbines of the air cycle turbomachine are supplied in parallel by stale air discharged from the cabin in order to be able to provide mechanical power for driving the compressors of the air cycle turbomachine, said turbines supplying said air injector at the outlet that opens into said air circulation duct upstream of said cooling exchangers.

A system according to this variant is therefore configured to be able to present at least one flight mode and at least one ground mode, each mode resulting from the control of the control valves associated with the network of pipes connecting the various members of the system according to the invention.

The ground mode allows the motorized compressor to compress the outside air forming the fresh air source on the ground, and in particular in hot weather. This air is then cooled by the primary cooling exchanger, also called the exchanger PHx, and directed to the inlet of the first compressor of the turbomachine, also called the turbomachine ACM, to be compressed there a second time (thus creating a "boost" in pressure). This compressed air is then cooled by the main cooling exchanger, also called the exchanger MHx, then directed to the water extraction loop and the second turbine of the turbomachine ACM. The dried air is finally released through the first turbine of the turbomachine ACM to produce the maximum amount of cold power. The ventilation of the dynamic air duct (which forms the cold pass of the exchangers PHx and MHx) is provided by the air pump supplied by the second compressor of the turbomachine ACM, which compresses the ambient air.

The flight mode allows a first flow of fresh air to be compressed by the motorized compressor, then cooled by the exchanger from a predetermined altitude PHx. A second compressed air flow is generated by the compressors of the turbomachine ACM and cooled by the exchanger MHx. The two air flows are brought together at the outlet of MHx to be directed toward the cabin, bypassing the water extraction loop. The first and second turbines of the turbomachine ACM are supplied by a flow of stale air discharged from the cabin, which makes it possible to drive the first and second compressors of the turbomachine mounted on the same mechanical shaft as the turbines in rotation. The cold air flow produced by the two turbines of the turbomachine ACM is injected via the air injector into the dynamic air circulation duct, upstream of the exchangers MHx and PHx.

The flow of fresh air produced by the turbomachine ACM allows the flow rate of the motorized compressor to be reduced, which is favorable to the optimization of the aerodynamic operating point insofar as the ground and flight points of the compressor field are brought closer to one another.

The ground mode, for example, is activated when the aircraft is on the ground and at low altitude (for example at an altitude below 15,000 feet) so as to be able to generate the maximum of cold power by the "boost" in pressure obtained by putting the motorized compressor and the first compressor of the turbomachine ACM in series, and separating the water obtained by connection with the water extraction loop.

When the aircraft is at medium or high altitude (e.g. above 15,000 feet on a hot day or above 25,000 feet on a cold day), water separation is no longer necessary and is rendered inactive by bypassing the water extraction loop (for example by opening a bypass valve associated with this water extraction loop). In addition, the turbomachine ACM produces a flow of fresh air, which makes it possible to reduce the flow rate of the motorized compressor.

Advantageously and according to the invention, at least one control valve is a valve controlled by a control module as a function of the flight conditions of the aircraft.

According to the invention, the control valves that make it possible to switch from ground mode to flight mode and vice versa, can be either altitude valves switching spontaneously from an open position to a closed position as a function of a parameter representative of the altitude of the aircraft when directing the air flows at the inlet and at the outlet of the compressors and turbines of the turbomachine ACM, or can be controlled by a control module configured to act on the actuators of these valves as a function of the flight conditions.

Advantageously and according to the invention, said fresh air source comprises a device for taking dynamic air from a scoop on the aircraft.

The invention also relates to an aircraft comprising a cabin and to an air conditioning system for this cabin, characterized by the said air conditioning system for the cabin being a system according to the invention.

The advantages and technical effects of an air conditioning system according to the invention apply, mutatis mutandis, to an aircraft according to the invention.

The invention also relates to a method for air conditioning the cabin of an aircraft comprising a source of fresh air, a duct for circulating dynamic air taken from outside the aircraft, a cooling exchanger, called a primary cooling exchanger, which is housed in said dynamic air circulation duct, a cooling exchanger, called a main cooling exchanger, which is housed in said dynamic air circulation duct, an electrically driven motorized compressor, an air cycle turbomachine comprising at least a first compressor and a first turbine mechanically connected to one another, and a network of pipes and control valves.

A method according to the invention is characterized in that it comprises the following steps:
- the fresh air is compressed by said motorized compressor,
- the air compressed by said motorized compressor is conveyed by said network of pipes to said primary cooling exchanger (PHx),
- the air cooled by said primary cooling exchanger is conveyed by said network of pipes, depending on the flight conditions, either to said first compressor of said air cycle turbomachine to undergo a second compression there, or to said cabin,
- when the flight conditions so require, the air conveyed to said first compressor is then cooled by said main cooling exchanger before being released by at least said first turbine and conveyed by said network of pipes to said cabin,
- depending on the flight conditions, said first turbine of said air cycle turbomachine is supplied either by stale air discharged from said cabin, or by air cooled by said main cooling exchanger, in order to be able to put at least said first compressor in rotation,
- said first turbine of said air cycle turbomachine will supply, depending on the flight conditions, either said cabin or an air injector that opens into said dynamic air circulation duct upstream of said cooling exchangers.

An air conditioning method according to the invention would be advantageously implemented in an air conditioning system according to the invention, and an air conditioning system according to the invention would advantageously implement a method according to the invention.

Thus, the advantages and technical effects of an air conditioning system according to the invention apply, mutatis mutandis, to a method according to the invention.

The invention also relates to an air conditioning system, an air conditioning method and an aircraft comprising such an air conditioning system, characterized by combining all or some of the features mentioned above or below.

LIST OF FIGURES

Further aims, features and advantages of the invention will become apparent upon reading the following description, which is provided solely by way of a non-limiting example, and which refers to the accompanying figures, in which:

FIG. 1 is a schematic view of an air conditioning system according to one implementation of the invention, FIG. 2 is a schematic view of the air conditioning system from FIG. 1 in ground mode, FIG. 3 is a schematic view of the air conditioning system from FIG. 1 in flight mode.

DETAILED DESCRIPTION OF AN EMBODIMENT OF THE INVENTION

For the sake of illustration and clarity, scales and proportions are not strictly adhered to in the figures.

Moreover, identical, similar or analogous elements are denoted using the same reference signs throughout the figures.

FIG. 1 describes an electrical air conditioning system for a cabin 10 of an aircraft, comprising a source 11 of fresh air, a duct 12 for circulating dynamic air taken from outside the aircraft, and a network of pipes 30, 31, 32, 33, 34, 35, 36, 37, 38, 39, 40, 41, 42, 43, 44, 45, 46, 47 and control valves 20, 21, 22, 23, 24, 25, 26, 27, 28 configured so as to be able to regulate the flow of air circulating through the ducts as a function of the flight conditions of the aircraft.

An air conditioning system according to the invention also comprises an electrically driven motorized compressor 13 comprising an air inlet 13a, fluidically connected by the pipe 45 from the network of pipes to the source 11 of fresh air, and an air outlet 13b connected to a primary cooling exchanger PHx housed in the dynamic air circulation duct 12 by the pipe 31 of the network of pipes equipped with the control valve 28.

The air conditioning system according to the embodiment of the figures also comprises an air cycle turbomachine 14 comprising a first compressor 15, a second compressor 16, a first turbine 17 and a second turbine 18, mechanically coupled to one another by a mechanical shaft 19.

The first compressor 15 comprises an air inlet 15a, connected to the exchanger PHx by means of the pipes 42 and 32 of the pipe network equipped with the control valve 21. Thus, if the control valve 21 is opened, the compressor 15 can be supplied with the air at the outlet of the exchanger PHx.

The inlet 15a of the compressor 15 is also connected to the outlet 16b of the second compressor 16 via the pipes 42 and 41 equipped with the control valve 20, which is a three-way valve. The outlet 16b of the compressor 16 is also connected to an air pump 51 that opens into the dynamic air duct 12 via the pipes 40, 41 equipped with the three-way valve 20.

The air outlet 15b of the compressor 15 is connected to a main cooling exchanger MHx, housed in the circulation duct 12 for dynamic air taken from outside the aircraft via a pipe 33.

On command, the control valve 20 allows either the delivery of the air compressed by the compressor 16 to the inlet of the compressor 15, or the supply of the pump 51 with air that opens into the air circulation duct 12 downstream of the cooling exchangers MHx and PHx.

The compressor 16 also comprises an inlet 16a connected to the source 11 of fresh air.

In addition, the first turbine 17 comprises an air inlet 17a connected to a port 54 for discharging stale air from the cabin 10 via the pipe 38 from the network of pipes equipped with a three-way control valve 27.

The inlet 17a of the turbine 17 can also be connected to a condenser 60 of a water extraction loop via the pipes 38 and 44 equipped with a three-way valve 27, which in turn is connected to the outlet 18b of the turbine 18 via the pipe 39 equipped with the valve 25.

The inlet 18a of the turbine 18 is connected to the port 54 for discharging stale air from the cabin 10 by means of the pipe 47 from the network of pipes equipped with the three-way valve 23.

The inlet 18a of the turbine 18 is also connected to a heater 61 via the pipe 43 from the network of pipes. The heater 61 is connected to a water separator 62 via the pipe 35. The water separator 62 is in turn connected to the condenser and to the heater 61, which in turn is connected to the exchanger MHx via the pipe 46 equipped with the valve 22.

The turbine 17 also comprises an air outlet 17b connected to the cabin 10 by means of the pipe 37 equipped with the three-way valve 26, in order to be able to supply it with air at a controlled pressure and temperature.

The outlet 17b is also connected to an air injector 52 opening into the air circulation duct 12, upstream of said cooling exchangers MHx, PHx, via the pipe 36 equipped with the three-way valve 26.

Thus, the air from the exchanger MHx can pass through the water extraction loop formed by the heater 61, the condenser 60 and the water separator 62, before supplying the inlet 18a of the turbine 18 for a first release, followed by a second release by the turbine 17 before supplying the cabin 10.

An air conditioning system according to the invention thus makes it possible, by controlling the control valves 20, 21, 22, 23, 24, 25, 26, 27, 28 associated with the pipes 30, 31, 32, 33, 34, 35, 36, 37, 38, 39, 40, 41, 42, 43, 44, 45, 46, 47, to present at least one ground operating mode and one flight operating mode.

FIG. 2 schematically illustrates the ground operating mode. The bold lines (in FIGS. 2 and 3) illustrate the flow of air within the system between the fresh air source 11 and the cabin 10, permitted by controlling the system control valves. The arrows drawn near the circulation pipes shown in bold lines in FIGS. 2 and 3 illustrate the direction of air circulation in the corresponding pipes.

In the operating mode of FIG. 2, the motorized compressor 13 is supplied by the fresh air source 11. This air is compressed by the motorized compressor 13, then directed through pipe 31 to the exchanger PHx. At the outlet of PHx, this air is directed to the first compressor 15 via the pipes 32 and 42 in order to undergo a second compression there. The air leaving the compressor 15 is then directed to the exchanger MHx through the pipe 33 to be cooled there. The air cooled by the exchanger MHx then passes through the water extraction loop formed by the heater 61, the condenser 60 and the water separator 62.

On leaving the water extraction loop, the air is successively released by the turbines 17 and 18, before supplying the cabin 10 via the pipe 37.

According to this embodiment, the air coming from the source 11 of fresh air also supplies the compressor 16 via the pipe 30, which compresses the air, which is then directed to the air pump 51, which opens into the air circulation duct 12 downstream of the exchangers MHx and PHx to ensure air circulation in the dynamic air duct 12.

To ensure air circulation in the dynamic air duct, it is possible according to another embodiment to replace the air pump 51 with an electric fan or a fan driven by the turbomachine.

This operating mode is for example activated when the aircraft is on the ground or at low altitude (for example below 15,000 feet of altitude), so as to be able to generate the maximum of cold power by the "boost" in pressure obtained by placing the motorized compressor and the first compressor of the turbomachine ACM in series, and separating the water obtained by the connection with the water extraction loop.

FIG. 3 schematically illustrates the in-flight operating mode defined as a flight beyond a predetermined altitude, which is for example set at 15,000 feet. The bold lines illustrate the path of the air within the system between the source 11 of fresh air and the cabin 10, made possible by means of the system's control valves.

In flight, the source 11 of fresh air supplies the motorized compressor 13, which compresses the air and directs it to the primary exchanger PHx via the pipe 31. The source 11 of fresh air also supplies the compressor 16 via the pipe 30. This compressor 16 compresses the air and then directs it to the compressor 15, via the pipes 41 and 42, for a second compression. The compressed air leaving the compressor 15 is directed to the main cooling exchanger MHx via the pipe 33.

The air flows from the motorized compressor 13 and from the double compression by the compressors 16 and 15 are brought together at the outlet of the exchangers at the node referenced 70. The resulting air flow is directed directly to the cabin 10 through the pipes 46 and 34. To do this, the water extraction loop is short-circuited by means of the valve 22.

In flight mode, the stale air discharged from the cabin through the port 54 directly supplies the turbines 17 and 18 to recover the energy of this air to ensure the driving of the compressors 16, 15 mounted on the same shaft 19 as the turbines.

In addition, the air flow at the outlet of the turbine 17 and the air flow at the outlet of the turbine 18 are combined at the node referenced 72, after which the resulting air flow is sent to said air injector 52 by the intermediate pipe 36 upstream of the exchangers MHx and PHx.

Flight mode is activated when the aircraft is at medium or high altitude (e.g. above 15,000 feet on a hot day or above 25,000 feet on a cold day). At these altitudes, water separation is no longer necessary and is rendered inactive by bypassing the water extraction loop. In addition, the turbomachine ACM produces a flow of fresh air, which makes it possible to reduce the flow rate of the motorized compressor.

An embodiment of the air conditioning system according to the invention has been described with a four-wheel turbomachine (two compressors and two turbines). However, according to other embodiments, the turbomachine may be a three-wheeler (two compressors and a turbine or a compressor and two turbines) or a two-wheeler (a compressor and a turbine).

The invention claimed is:

1. An electrical air conditioning system for a cabin of an aircraft comprising a source of fresh air, a circulation duct for dynamic air taken from outside the aircraft, a network of pipes and control valves configured to be able to regulate the flow of air circulating through said pipes according to the flight conditions of the aircraft, a heat exchanger, called the primary cooling exchanger, housed in said dynamic air circulation duct, a heat exchanger, called the main cooling exchanger, housed in said dynamic air circulation duct, the system comprising:
   an air injector opening into said dynamic air duct upstream of said cooling exchangers,
   a port for discharging stale air from said cabin,
   an electrically driven motorized compressor comprising an air inlet fluidically connected to said source of fresh air by said network of pipes, and an air outlet connected to said primary cooling exchanger, housed in said dynamic air circulation duct,
   an air cycle turbomachine comprising at least a first compressor and a first turbine mechanically coupled to one another by a mechanical shaft,
   said first compressor comprising an air inlet adapted to be able to be fluidically connected by said network of pipes, by means of said control valves, either to said primary cooling exchanger, or to said source of fresh air, and an air outlet fluidically connected to said main cooling exchanger, housed in said circulation duct for dynamic air taken from outside the aircraft,
   said first turbine comprising an air inlet adapted to be able to be fluidically connected by said network of pipes, by means of said control valves, either to said discharge port for discharging stale air from said cabin, or to said main cooling exchanger, and an air outlet adapted to be able to be fluidically connected, by said network of pipes, by means of said control valves, either to said cabin in order to be able to supply it with air at a controlled pressure and temperature, or to said air injector opening into said air circulation duct, upstream of said cooling exchangers.

2. The air conditioning system according to claim 1, wherein said air cycle turbomachine comprises at least a second compressor and a second turbine mechanically coupled to said first compressor and to said first turbine by said mechanical shaft, said second compressor comprising an air inlet fluidically connected to said source of fresh air, and an air outlet adapted to be able to be fluidically connected, on command by said control valves, either to said air inlet of said first compressor, or to an air pump opening into said dynamic air duct downstream of said cooling exchangers, said second turbine comprising an air inlet adapted to be able to be fluidically connected, by means of said control valves, either to said main cooling exchanger, or to said stale air discharge port of said cabin, and an air outlet adapted to be able to be fluidically connected, by means of said control valves, either to said air inlet of said first turbine, or to said injector opening into said dynamic air duct upstream of said cooling exchangers.

3. The air conditioning system according to claim 1, wherein the system further comprises a water extraction loop adapted to be able to be fluidically connected by said network of pipes, by means of an altitude valve, to said main cooling exchanger and to at least a turbine of said air cycle turbomachine, so as to be able to extract the water present in the air delivered by said main cooling exchanger before being delivered to this release turbine.

4. The air conditioning system according to claim 2, the system further comprising a water extraction loop adapted to be able to be fluidically connected by said network of pipes, by means of an altitude valve, to said main cooling exchanger and to at least a turbine of said air cycle turbomachine, so as to be able to extract the water present in the air delivered by said main cooling exchanger before being delivered to this release turbine, wherein said control valves are controlled to allow at least the following operating modes:

an operating mode, called ground mode, in which said motorized compressor is supplied by the source of fresh air so as to be able to compress this air, which, after cooling by said primary cooling exchanger, is then directed to the first compressor of said air cycle turbomachine to undergo a second compression therein, then to said water extraction loop and said turbines of the turbomachine supplied in series to undergo a double expansion therein before supplying said cabin of the aircraft, and in which said second compressor of said turbomachine is further supplied by said source of fresh air, which, after compression, is then directed to said air pump arranged downstream of the cooling exchangers to ensure dynamic air circulation in said dynamic air duct, and an operating mode, called flight mode, in which said source of fresh air supplies, in parallel, said motorized compressor and said compressors of said turbomachine supplied in series, so as to be able to undergo a double compression therein before being cooled respectively by said primary cooling exchanger and said main cooling exchanger, and to be combined in a common air flow directed to said cabin by short-circuiting said extraction loop, and in said turbines of the air cycle turbomachine are supplied in parallel by stale air discharged from the cabin in order to be able to provide mechanical power for driving the compressors of the air cycle turbomachine, said turbines supplying said air injector at the outlet that opens into said air circulation duct upstream of said cooling exchangers.

5. The air conditioning system according to claim 4, wherein at least one control valve is a valve controlled by a control module as a function of the flight conditions of the aircraft.

6. The air conditioning system according to claim 1, wherein said source of fresh air comprises a device for taking dynamic air from a scoop on the aircraft.

7. An aircraft comprising a cabin, wherein the aircraft comprises an air conditioning system supplying said cabin of the aircraft with air conditioning, said system comprising:

comprising a source of fresh air, a circulation duct for dynamic air taken from outside the aircraft, a network of pipes and control valves configured to be able to regulate the flow of air circulating through said pipes according to the flight conditions of the aircraft, a heat exchanger, called the primary cooling exchanger, housed in said dynamic air circulation duct, a heat exchanger, called the main cooling exchanger, housed in said dynamic air circulation duct;

an air injector opening into a dynamic air duct upstream of said cooling exchangers, a port for discharging stale air from said cabin, an electrically driven motorized compressor comprising an air inlet fluidically connected to said source of fresh air by said network of pipes, and an air outlet connected to said primary cooling exchanger, housed in said dynamic air circulation duct, an air cycle turbomachine comprising at least a first compressor and a first turbine mechanically coupled to one another by a mechanical shaft, said first compressor comprising an air inlet adapted to be able to be fluidically connected by said network of pipes, by means of said control valves, either to said primary cooling exchanger, or to said source of fresh air, and an air outlet fluidically connected to said main cooling exchanger, housed in said circulation duct for dynamic air taken from outside the aircraft, said first turbine comprising an air inlet adapted to be able to be fluidically connected by said network of pipes, by means of said control valves, either to said discharge port for discharging stale air from said cabin, or to said main cooling exchanger, and an air outlet adapted to be able to be fluidically connected, by said network of pipes, by means of said control valves, either to said cabin in order to be able to supply it with air at a controlled pressure and temperature, or to said air injector opening into said air circulation duct, upstream of said cooling exchangers.

8. A method for air conditioning a cabin of an aircraft comprising a source of fresh air, a duct for circulating dynamic air taken from outside the aircraft, a cooling exchanger, called a primary cooling exchanger, housed in said dynamic air circulation duct, a cooling exchanger, called a main cooling exchanger, housed in said dynamic air circulation duct, an electrically driven motorized compressor, an air cycle turbomachine comprising at least a first compressor and a first turbine mechanically connected to one another, and a network of pipes and control valves, the method comprising the following steps:

the fresh air is compressed by said motorized compressor, the air compressed by said motorized compressor is conveyed by said network of pipes to said primary cooling exchanger, the air cooled by said primary cooling exchanger is conveyed by said network of pipes, depending on the flight conditions, either to said first compressor of said air cycle turbomachine to undergo a second compression there, or to said cabin, when the flight conditions so require, the air conveyed to said first compressor is then cooled by said main cooling exchanger before being expanded by at least said first turbine and conveyed by said network of pipes to said cabin, said first turbine of said air cycle turbomachine is supplied, depending on flight conditions, either by stale air discharged from said cabin, or by air cooled by said main cooling exchanger in order to be able to put at least said first compressor in rotation, said first turbine of said air cycle turbomachine supplies, depending on the flight conditions, either said cabin or an air injector that opens into said dynamic air circulation duct upstream of said cooling exchangers.

* * * * *